(12) United States Patent
Jessen (10) Patent No.: US 9,126,434 B2
(45) Date of Patent: Sep. 8, 2015

(54) RADIANT HEAT CONTROL WITH ADJUSTABLE REFLECTIVE ELEMENT

(71) Applicant: Robert Jessen, Berthoud, CO (US)

(72) Inventor: Robert Jessen, Berthoud, CO (US)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 14/161,531

(22) Filed: Jan. 22, 2014

(65) Prior Publication Data

US 2015/0202892 A1    Jul. 23, 2015

(51) Int. Cl.
*F26B 3/28* (2006.01)
*B41J 11/00* (2006.01)

(52) U.S. Cl.
CPC . *B41J 11/002* (2013.01); *F26B 3/28* (2013.01)

(58) Field of Classification Search
CPC ............... F26B 3/00; F26B 3/28; E06B 3/66; G02F 1/153
USPC .............. 34/167, 172, 274, 381; 428/34, 220; 359/267, 290
See application file for complete search history.

(56) References Cited

U.S. PATENT DOCUMENTS

| | | | | |
|---|---|---|---|---|
| 3,733,709 | A | * | 5/1973 | Bassemir et al. ............... 34/277 |
| 3,819,929 | A | * | 6/1974 | Newman ........................ 362/218 |
| 4,832,467 | A |  | 5/1989 | Miyagi et al. |
| 5,166,523 | A | * | 11/1992 | Berghaeuser ............... 250/316.1 |
| 5,457,554 | A | * | 10/1995 | Faris .............................. 349/13 |
| 5,490,638 | A | * | 2/1996 | Driftmyer et al. ............ 242/421 |
| 5,502,310 | A |  | 3/1996 | Niestrath et al. |
| 6,058,621 | A | * | 5/2000 | Piccinino et al. ............... 34/273 |
| 6,088,931 | A | * | 7/2000 | Aylor et al. ..................... 34/267 |
| 6,124,600 | A | * | 9/2000 | Moroishi et al. .......... 250/504 R |
| 6,621,087 | B1 | * | 9/2003 | Bisges et al. ............... 250/492.1 |
| 6,647,166 | B2 |  | 11/2003 | Richardson |
| 6,671,080 | B2 |  | 12/2003 | Poll et al. |
| 7,290,874 | B2 | * | 11/2007 | Codos .......................... 347/102 |
| 7,679,808 | B2 |  | 3/2010 | Kim |

(Continued)

FOREIGN PATENT DOCUMENTS

| | | |
|---|---|---|
| GB | 2336895 A | 11/1999 |
| JP | 2003170573 A | 6/2003 |

(Continued)

OTHER PUBLICATIONS

Berkley Laboratories, Low Cost, Stable Switchable Mirrors: Inexpensive Transition Metal Hydrides, Available Technologies, Transition Metal Switchable Mirrors, http://www.lbl.gov/tt/techs/lbnl1665.html.

(Continued)

*Primary Examiner* — Stephen M Gravini
(74) *Attorney, Agent, or Firm* — Duft Bornsen & Fettig LLP (57) ABSTRACT

Systems and methods are provided for improved radiant heat control within a dryer of a printing system with reflective elements. One embodiment is a dryer of a printing system. The drying includes a radiant energy source configured to apply heat to a print medium. The dryer also includes a reflective element installed between the radiant energy source and the print medium. The reflective element is configured to have varying levels of reflectance. The dryer also includes a controller configured to determine an amount of heat to supply to a region of the print medium, and to adjust an amount of reflectance of the reflective element based on the determined amount of heat.

20 Claims, 8 Drawing Sheets

(56) References Cited

U.S. PATENT DOCUMENTS

| | | | |
|---|---|---|---|
| 7,828,412 B2* | 11/2010 | Edwards et al. | 347/37 |
| 7,894,117 B2 | 2/2011 | Finlayson | |
| 7,933,059 B2 | 4/2011 | Nishino et al. | |
| 7,966,743 B2* | 6/2011 | Piatt et al. | 34/82 |
| 8,284,336 B2 | 10/2012 | Powers et al. | |
| 8,534,825 B2* | 9/2013 | Leighton et al. | 347/102 |
| 8,711,193 B2* | 4/2014 | Benton et al. | 347/198 |
| 8,984,764 B2* | 3/2015 | Rae et al. | 34/274 |
| 2003/0013034 A1* | 1/2003 | Behnke et al. | 430/124 |
| 2003/0234954 A1* | 12/2003 | Hohensee et al. | 358/1.15 |
| 2006/0062983 A1 | 3/2006 | Irvin, Jr. et al. | |
| 2010/0181706 A1* | 7/2010 | Ruuttu et al. | 264/400 |
| 2011/0151202 A1* | 6/2011 | Feinstein et al. | 428/195.1 |
| 2012/0140311 A1 | 6/2012 | Powers et al. | |
| 2012/0212719 A1 | 8/2012 | Bianucci et al. | |
| 2012/0291767 A1 | 11/2012 | Spear | |
| 2012/0301642 A1 | 11/2012 | Roberts | |
| 2013/0001478 A1 | 1/2013 | Allemand et al. | |
| 2013/0003157 A1 | 1/2013 | Wang et al. | |
| 2013/0200606 A1* | 8/2013 | Omar | 283/74 |

FOREIGN PATENT DOCUMENTS

| | | | |
|---|---|---|---|
| JP | 2011105000 A * | 6/2011 | |
| WO | 2010109435 A1 | 9/2010 | |

OTHER PUBLICATIONS

High-efficiency fabrication technology for switchable mirror devices, Apr. 9, 2012, http://www.nanowerk.com/news/newsid=24852.php.

Kent Optronics http://kentoptronics.com/mirror.html.

Development of a Switchable Mirror Film That is Electrically Changed between Reflective and Transparent States http://www.aist.go.jp/aist_e/latest_research/2007/20071213/20071213.html.

High-efficiency Fabrication Technology for Switchable Mirror Devices Capable of Switching between Mirror and Transparent States http://www.aist.go.jp/aist_e/latest_research/2012/20120409/20120409.html.

Measurement of Solar Transmittance through Plate Glass http://www.shimadzu.com/an/industry/ceramicsmetalsmining/chem0501005.htm.

Smart glass blocks heat or light at flick of a switch http://www.nature.com/news/smart-glass-blocks-heat-or-light-at-flick-of-a-switch-1.13558.

Universal Smart Window http://www.nature.com/nature/journal/v500/n7462/extref/nature12398-s1.pdf.

* cited by examiner

FIG. 8

RADIANT HEAT CONTROL WITH ADJUSTABLE REFLECTIVE ELEMENT

FIELD OF THE INVENTION

The invention relates to the field of printing systems, and in particular, to radiant drying of ink applied to print media.

BACKGROUND

Entities with substantial printing demands typically use a production printer. A production printer is a high-speed printer used for volume printing (e.g., one hundred pages per minute or more). Production printers include continuous-forms printers that print on a web of print media stored on a large roll.

A production printer typically includes a localized print controller that controls the overall operation of the printing system, and a print engine (sometimes referred to as an "imaging engine" or a "marking engine"). The print engine includes one or more printhead assemblies, with each assembly including a printhead controller and a printhead (or array of printheads). An individual printhead includes multiple tiny nozzles that are configured to discharge ink as controlled by the printhead controller. A printhead array is formed from multiple printheads that are spaced in series across the width of the web of print media.

While the printer prints, the web is quickly passed underneath the nozzles, which discharge ink onto the web at intervals to form pixels. A radiant dryer, installed downstream from the printer, may assist in drying the wet ink on the web after the web leaves the printer. A typical radiant dryer includes an array of radiant heat lamps. Drying the web can prove challenging due to variation of a number of factors, including the web's physical characteristics, speed of the web, print quality demands, etc. Moreover, insufficient drying may result in smearing while excessive drying may result in scorching, curling, and other defects. Therefore, precise control over the amount and location of heat applied to a web is desirable.

SUMMARY

Embodiments described herein provide for adjusting the reflectivity of a reflective element to control the amount and location of radiant heat in a dryer. A reflective element is placed in the dryer between a radiant heat source and a web. To increase the level of heat at the web surface, the reflective element is driven toward a transparent state. To decrease the level of heat at the web surface, the reflective element is driven toward a reflective state. The mirror may be driven to any range of reflective states, including fully reflective, fully transparent, and anything between (i.e., partial reflective) for precise heat control at the web, which allows for improved print quality.

One embodiment is a dryer of a printing system. The drying includes a radiant energy source configured to apply heat to a print medium. The dryer also includes a reflective element installed between the radiant energy source and the print medium. The reflective element is configured to have varying levels of reflectance. The dryer also includes a controller configured to determine an amount of heat to supply to a region of the print medium, and to adjust an amount of reflectance of the reflective element based on the determined amount of heat.

Another embodiment is a method. The method includes operating a heating element within an interior of a dryer. The method also includes determining an amount of heat to supply to one or more regions of the web. The method further includes adjusting an amount of reflectance of a reflective element based on the determined amount of heat.

Yet another embodiment is a non-transitory computer readable medium embodying programmed instructions which, when executed by a processor, are configured for performing a method. The method includes operating a heating element within an interior of a dryer. The method also includes determining an amount of heat to supply to one or more regions of the web. The method further includes adjusting an amount of reflectance of a reflective element based on the determined amount of heat.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
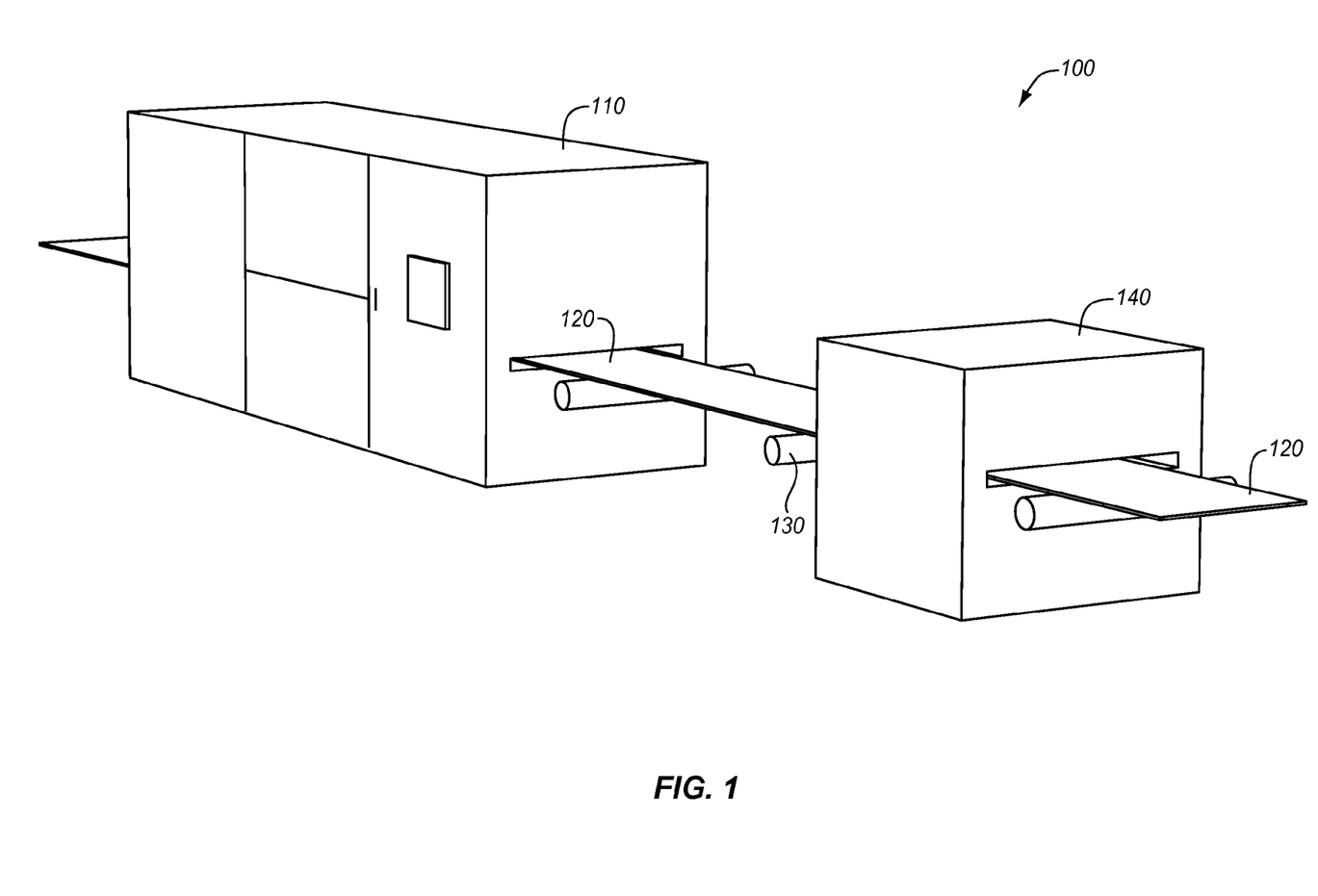
FIG. 1 illustrates an exemplary continuous-forms printing system.

FIG. 1 illustrates an exemplary continuous-forms printing system 100. Printing system 100 includes production printer 110, which is configured to apply ink onto a web 120 of continuous-form print media (e.g., paper). As used herein, the word "ink" is used to refer to any suitable marking fluid (e.g., aqueous inks, oil-based paints, etc.). Printer 110 may comprise an inkjet printer that applies colored inks, such as Cyan (C), Magenta (M), Yellow (Y), Key (K) black, white, or clear inks. The ink applied by printer 110 to web is wet, meaning that the ink may smear if it is not dried before further processing. One or more rollers 130 position web 120 as it travels through printing system 100.

To dry ink, printing system 100 also includes drying system 140 (e.g., a radiant dryer). Drying system 140 can be installed in printer 110, or can be implemented as an independent device downstream from printer 110 (as shown in FIG. 1). Web 120 travels through drying system 140 where an array of heating elements such as heat lamps (not shown) radiate thermal energy to dry the ink onto web 120.

However, drying ink onto web 120 can be a challenging process since conventional drying techniques (i.e., an array of heat lamps that emit infrared (IR) or near-infrared (NIR) energy and heat) have limited ability to regulate heat flux and target locations on the web. Additionally, the physical sizes of the lamps impose limits on the resolution of the heat targeting.

Figure 2:
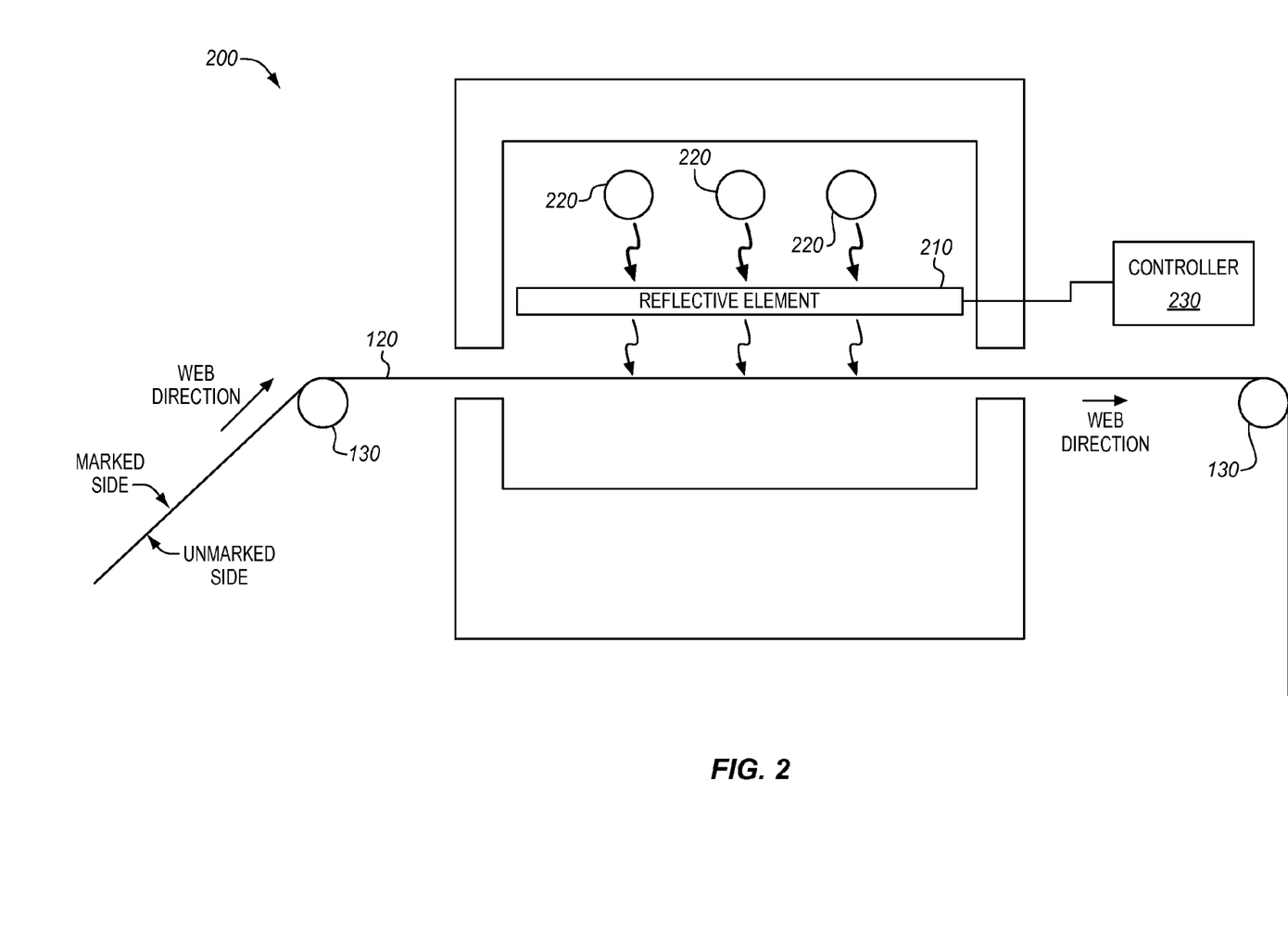
FIG. 2 is a block diagram of a drying system in an exemplary embodiment.

FIG. 2 shows a block diagram of drying system 200 in an exemplary embodiment. A source of radiant energy, such as that supplied by one or more heating elements 220, heats a web 120 as the web 120 travels through the drying system 200. The web 120 may be tensioned by one or more rollers 130 as it travels through the drying system 200 in the direction indicated in FIG. 2.

Drying system 200 has been enhanced with a reflective element 210 that dynamically transitions between reflective and transparent states based on input from controller 230. When reflective element 210 is in a fully reflective state, radiant energy from heating elements 220 is reflected back towards heating elements 220 such that the amount of heat that reaches the web 120 is eliminated or substantially reduced. When reflective element 210 is in a fully transparent (i.e., transmissive) state, radiant energy from heating elements 220 passes through the reflective element 210 and onto the web 120 with little or no interruption from reflective element 210. Furthermore, reflective element 210 may enter virtually any state that is in-between fully reflective and fully transparent (i.e., partial reflectance, partial transparent) to produce a corresponding in-between level of heat at one or more regions of the web 120.

Reflective element 210 may comprise any system, components, or device suitable to transition its reflectivity based on an input. For example, reflective element 210 may comprise an electrochromic device that changes its reflectivity based on an application of a voltage supplied to its electrodes. In another example, reflective element 210 may comprise a transition metal switchable mirror (TMSM) which comprises a thin film of an alloy of magnesium and one or more transition metals. The film enables the glass to which it is bonded to be reversibly converted between reflective and transparent states either by applying an electrical current or exposing the film to hydrogen gas. In one embodiment, reflective element 210 is disposed in a plane that is parallel to web 120 to minimize refraction distortion of the radiant energy supplied by heating elements 220.

Controller 230 comprises any system, component, or device configured to control the reflectivity of reflective element 210. Controller 230 may drive, or transition, reflective element 210 to one reflective state or another based on, for example, sensor input, user input, print engine controller input, media type, media speed, ink type, ambient temperature, or other print related variables. In one embodiment, controller 230 includes a variable charge source driver that can apply a range of low voltages to reflective element 210 to induce corresponding ranges of reflectivity.

Figure 3:
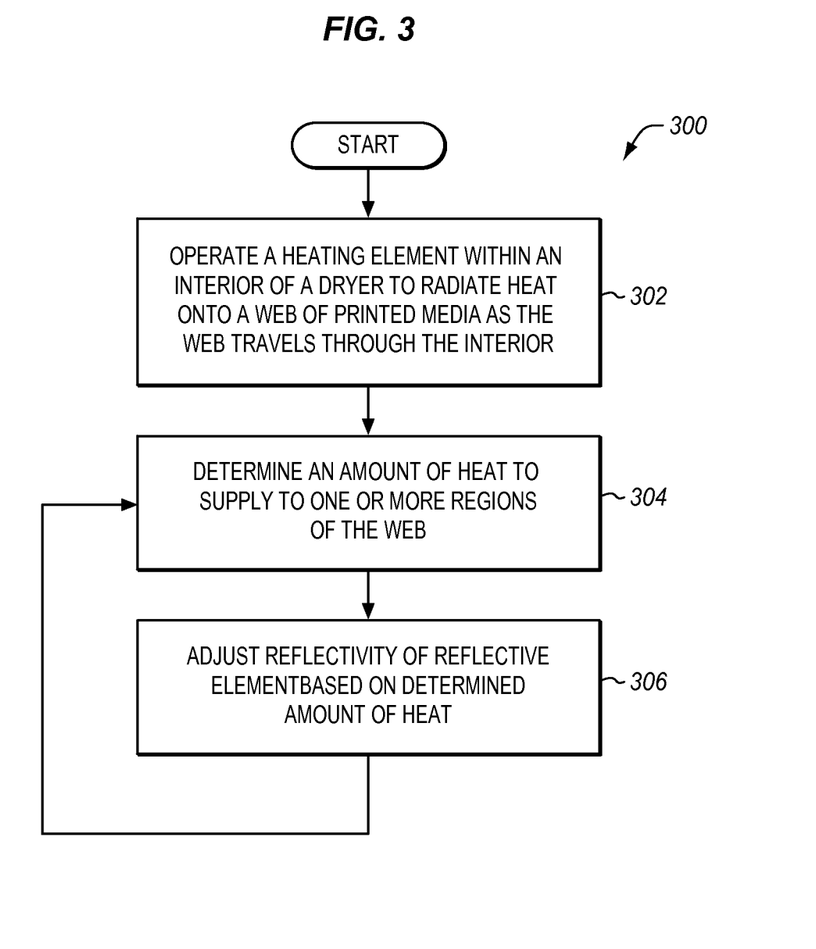
FIG. 3 is a flowchart illustrating a method for operating a drying system in an exemplary embodiment.

Illustrative details of the operation of drying system 200 will be discussed with regard to FIG. 3. Assume, for this embodiment, that an upstream printer has marked web 120, and that web 120 is being received at drying system 200 for processing. FIG. 3 is a flowchart illustrating a method 300 for operating a drying system in an exemplary embodiment. The steps of method 300 are described with reference to drying system 200 of FIG. 2, but those skilled in the art will appreciate that method 300 may be performed in other systems. The steps of the flowcharts described herein are not all inclusive and may include other steps not shown. The steps described herein may also be performed in an alternative order.

At step 302, heating elements 220 are operated to radiate broad spectrum energy onto web 120 as web 120 travels across the interior of drying system 200. In one embodiment, heating elements 220 are heat lamps that are electrically powered to radiate thermal energy to heat web 120. At step 304, controller 230 determines an amount of heat to supply to one or more regions of the web. The amount and/or location of heat may be based on a number of print related variables.

At step 306, controller 230 adjusts the reflective properties of reflective element 210 based on the amount and/or location of heat to be supplied to web 120. Thus, reflective element 210 passes an optimal amount of heat through it and onto web 120 under direction of controller 230. For instance, controller 230 may selectively cause a transition of the reflective properties of reflective element 210 to increase or decrease reflectivity and thereby cause a corresponding decrease or increase in the intensity of the heat that reaches web 120, respectively.

Steps 304 and 306 may be repeated such that the controller 340 continually and adaptively adjusts/readjusts the reflectivity of reflective element 210 for dynamic heating of web 120. The increased control over the application of heat to the web 120 reduces deformities that can be caused by under heating or over heating the web 120. The reflective element 210 also advantageously allows for precise heat control and can substantially reduce, or eliminate, the need to adjust lamp output and orientation, particularly in situations where print related variables are changed. Moreover, when the reflective element 210 is driven toward a reflective state, drying system 200 can collect heat in its upper section in the space above the reflective element 210. Upon a determination that an increased level of heat is to be provided at the surface of the web 120, the reflective element 210 is driven toward a transmissive state and the heat which has collected in the upper section is passed through the reflective element 210 and towards the web 120, thereby making highly efficient use of the heat within the drying system 200.

Figure 4:
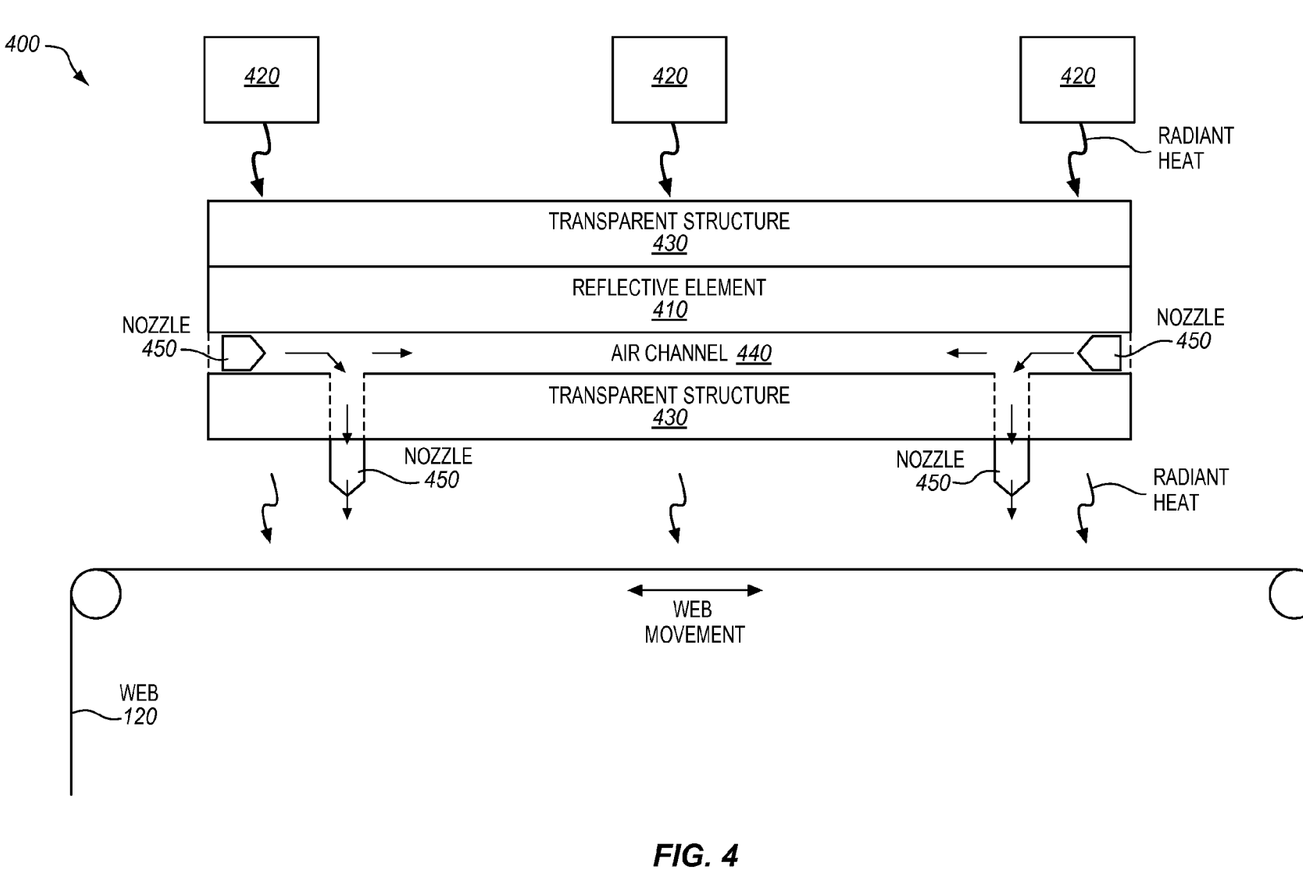
FIGS. 4-6 are block diagrams illustrating drying systems in exemplary implementations.

FIG. 4 is a block diagram of an exemplary embodiment of a dryer system 400. Dryer system 400, configured with reflective element 410 and radiant energy sources 420, may collect excess heat in certain locations. Moreover, the surface of reflective element 410 may at times reach high temperatures. To help cool areas of dryer system 400 and prevent damage to printing components therein, drying system 400 is enhanced with one or more transparent structures 430, which may comprise additional reflective elements, protective glass, lenses and/or optical filters. Additionally, transparent structures 430 may be positioned to create air channel(s) 440 and may also further be configured with one or more nozzle(s) 450 to circulate air throughout dryer system 400. Transparent structures 430 pass heat emitted from energy sources 420 with little or no interruption while providing various additional functionality as described in more detail below.

As shown in FIG. 4, transparent structures 430 may be disposed within dryer system 400 vertically above and/or vertically below reflective element 410. Transparent structures 430 may be adjacent to reflective element 410 (e.g., upper transparent structure 430 in FIG. 4) or disposed some distance relative to reflective element 410 (e.g., lower transparent structure 430 in FIG. 4) to create a space therebetween. In one embodiment, the space between reflective element 410 and transparent structure 430 is used as a conduit to circulate a fluid (e.g., air channel 440 as shown in FIG. 4). Alternatively or additionally, conduits may be created by the space between two transparent structures 430 or included within transparent structure 430. For instance, as shown in FIG. 4, lower transparent structure 430 includes two vertical channels for fluid passage.

Additionally, one or more nozzles 450 and/or vents may be disposed in the dryer system 400 to circulate or dissipate heat. The nozzles 450 may be controlled by a control system configured to regulate the temperature of reflective element 410 and/or other areas of the drying system 400. Temperature regulation may be based on, for example, temperature measurements of reflective element 410 or web 120. Nozzles 450 may also help dissipate moisture collected at the surface of web 120. In one example, and as shown in FIG. 4, some nozzles 450 eject air horizontally in air channel 440, while other nozzles 450 route air at least some of the air downward toward web 120 to dissipate built-up moisture collected at the surface of web 120. In that regard, dryer system 400 may additionally include moisture sensor/control and housing ventilation (not shown) to regulate dryer system 400 conditions. It will be appreciated that the particular embodiments and examples described herein are for explanatory purposes and that numerous variations are possible. For example, nozzles 450, air channel 440 and associated control may alternatively or additionally be configured to dissipate heat collected above reflective element 410.

In one embodiment, one or more of transparent structures 430 comprise sheet glass that protect the surface of reflective element 410 and prevent damage to objects that may contact reflective element 410. Additionally or alternatively, one or more transparent structures 430 comprise optical filters such as absorptive filters or dichroic/interference filters (e.g., "hot mirrors") that prevent specific wavelengths of energy emitted by energy sources 230 from reaching web 120, while allowing other wavelengths of light to pass through, heating web 120. As such, transparent structure 430 may help ensure no overheating occurs on the surface of reflective element 410 or web 120. Absorptive filter transparent structure 430 and/or sheet glass transparent structure 430 may optionally be combined with other embodiments described herein, such as with the cooling functionality described above.

Figure 5:
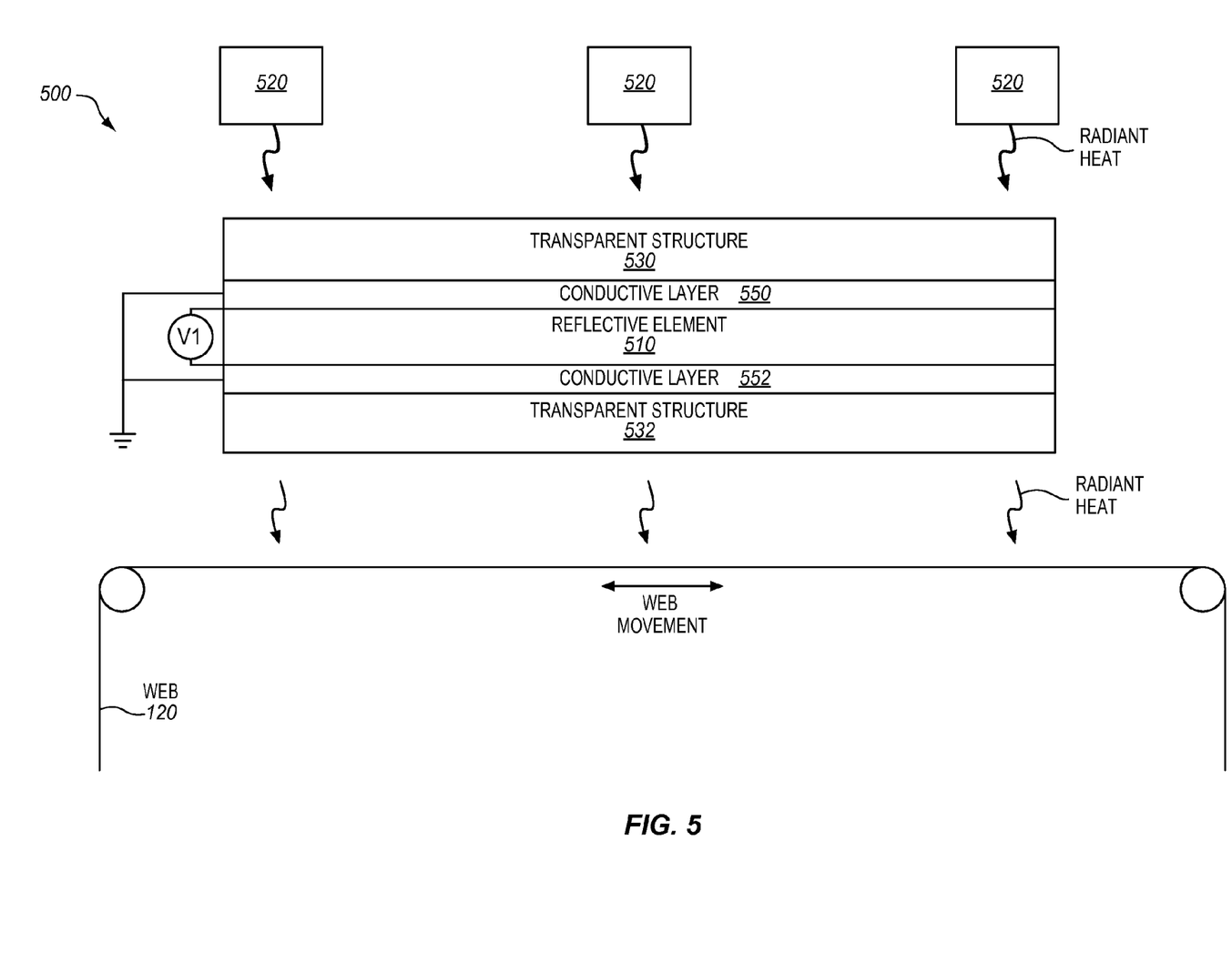

FIG. 5 is a block diagram of another exemplary embodiment of a dryer system 500. FIG. 5 includes one or more grounded conductive layers 550/552 disposed around or adjacent to reflective element 510. Conductive layers 550/552 provide isolation between electrical components of dryer system 500 and reflective element 510 to reduce problems associated with electromagnetic interference (EMI) and electromagnetic compatibility (EMC). For example, electromagnetic (EM) noise from the radiant energy sources 520 or static charge collected on the moving web 120 may drive the reflective element 510 to an undesirable reflective state through the electrical connections on the reflective element 510 and its drive circuits.

In one embodiment, conductive layers 550/552 comprise transparent conductor shielding over the surface of reflective element 510 so as not to impede the heat control capability of reflective element 410. Top and/or bottom surfaces of reflective element 410 may be coated with a transparent conductor that is grounded, and conductive layer 550/552 may be protected by transparent structure 530, such as glass. Conductive layers 550/552 may be uniform or alternatively formed in a grid pattern. In one embodiment, conductive layer 550/552 is comprised of indium tin oxide (ITO) deposited on the surface of reflective element 510 by a physical vapor deposition process, such as electron beam evaporation or a sputter deposition technique.

Figure 6:
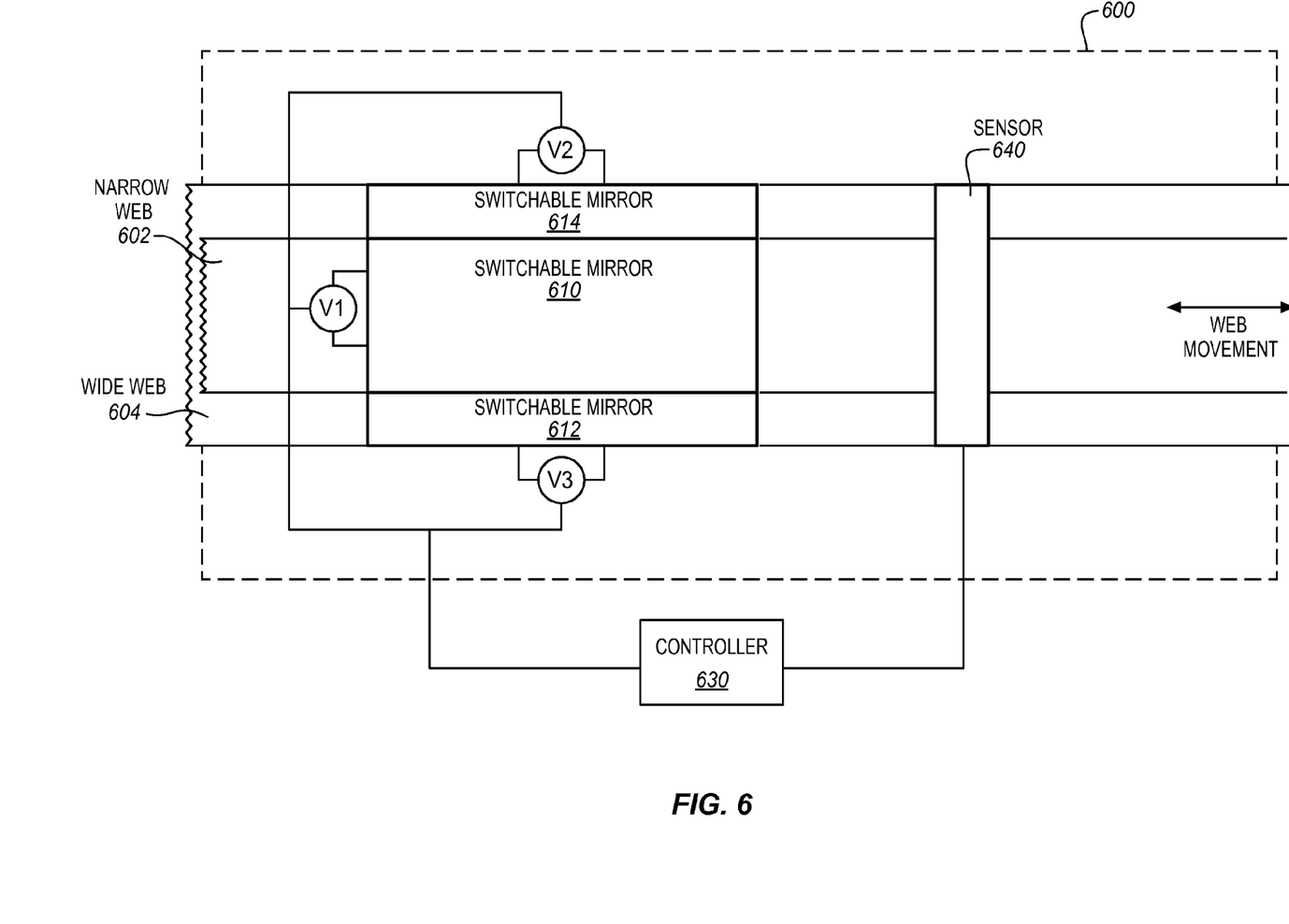

FIG. 6 is a block diagram of a top view of another exemplary embodiment of a dryer 600. In this embodiment, multiple switchable mirrors 610-614 are disposed in dryer 600 between one or more energy sources (not shown) and a web (e.g., narrow web 602 or wide web 604) of continuous-form print media. Each of switchable mirrors 610-614 may be independently controlled (e.g., by drive circuits V1-V3) and may cover different sectional areas within dryer 600 for increased granular control over the amount and location of heat that reaches the surface of web 602/604. Numerous variations are possible, switchable mirrors 610-614 may be adjacent to one another, in different vertical planes, in different horizontal planes, or disposed in dryer 600 as various combinations of the above. Moreover, one or more switchable mirrors 610-614 may be additionally or alternatively disposed beneath the web 120.

In one embodiment, switchable mirrors 610-614 form independent segments of one monolithic switchable mirror. The segments are created by conductor layer areas surrounded by gaps, and each segment includes a corresponding set of electrodes used to independently control a corresponding portion of the monolithic switchable mirror. Each switchable mirror 610-614 and/or segment transitions its reflective properties based on an independent input. In some embodiments, a matrix, or grid-like pattern, is formed on a switchable mirror to create many independently controlled areas on the switchable mirror. For example, Thin Film Transistors (TFT), such as those used on Liquid Crystal Displays (LCDs), may be formed onto a switchable mirror for heat granularity control at the pixel level.

As the example in FIG. 6 shows, the arrangement of switchable mirrors 610-614 in dryer 600 allows controller 630 to target heat in accordance with print related characteristics, such as different web width sizes. One or more sensors (e.g., sensor 640) located upstream and/or downstream from dryer 600 and/or reflective elements 610-614 may provide dynamic or static input to controller 630 regarding ink characteristics (e.g., amount, type, locations), web characteristics (e.g., type, speed, location, width), and/or temperature characteristics (e.g., dryer temperature, web temperature, temperature location) as the web travels. Controller 630 may independently drive each of switchable mirrors 610-614 to the appropriate level of reflectivity based on input from sensor 640 for optimal heat flux and location throughout dryer 600. Sensor 640 may comprise any system, component, or device configured to detect printer characteristics in one or more regions of the web 120. For example, the sensor 640 may comprise a laser, pneumatic, photoelectric, ultrasonic, infrared, optical, thermocouple, or any other suitable type of sensing device.

Figure 7:
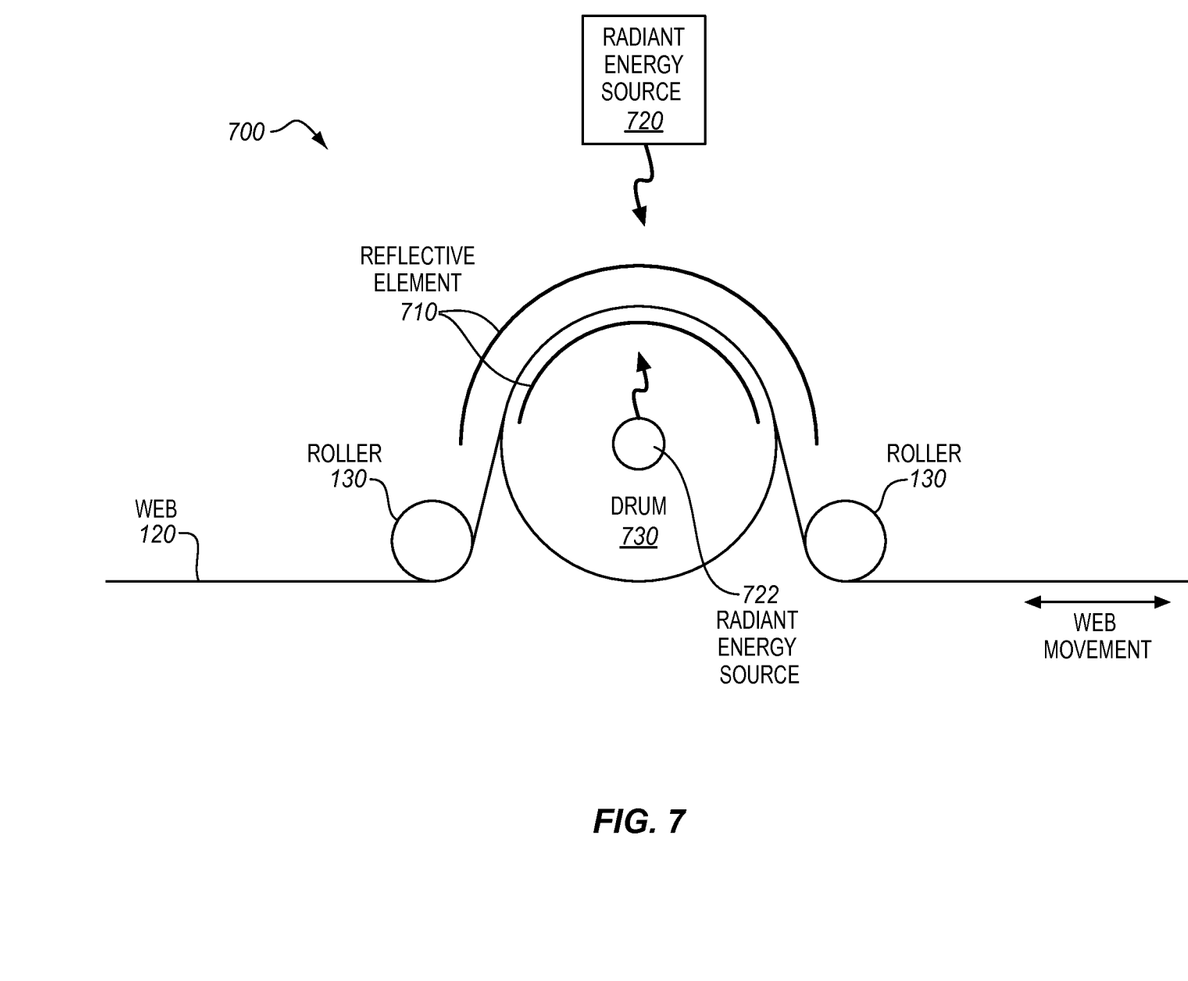
FIG. 7 is a block diagrams illustrating an exemplary system with curved reflective elements.

FIG. 7 is a block diagram of an exemplary embodiment of a system 700 with curved reflective elements. As web 120 travels over a drum 730, one or more curved reflective elements 710 having adjustable reflectivity are controlled to regulate the level of heat at the surface of the web 120, the surface of the drum 730, or both. Reflective element 710 may be disposed outside drum 730 and between radiant energy source 720 and web 120. Alternatively or additionally, reflective element 710 may be disposed within drum 730 to control conductive heat on one or more portions of the surface of drum 730 created from radiant energy source 722 inside drum 730. In one embodiment, drum 730 is hollow with a thermal conductive surface. In another embodiment, the curvature of reflective element(s) 710 is substantially similar to the curvature of drum 730 to minimize refraction distortion of the radiant energy. Numerous variations are possible, including drum 730 and reflective element 710 being deployed externally to or without dryer housing. Moreover, the system 700 may be used for multiple purposes, such as for drying ink or fusing toner onto a paper web.

While specific elements are described with regard to the exemplary embodiments of FIGS. 4-7, the arrangement and type of elements used may vary as desired in order to optimally provide heat to a web with a reflective element. For example, different numbers, arrangements, and types of components of each embodiment may be used or combined as desired. Moreover, the embodiments described may be applicable to other printer/dryer systems, such as non-continuous forms printer/dryer systems, solid ink printer/dryer systems, or electrophotographic toner printer/dryer systems.

Figure 8:
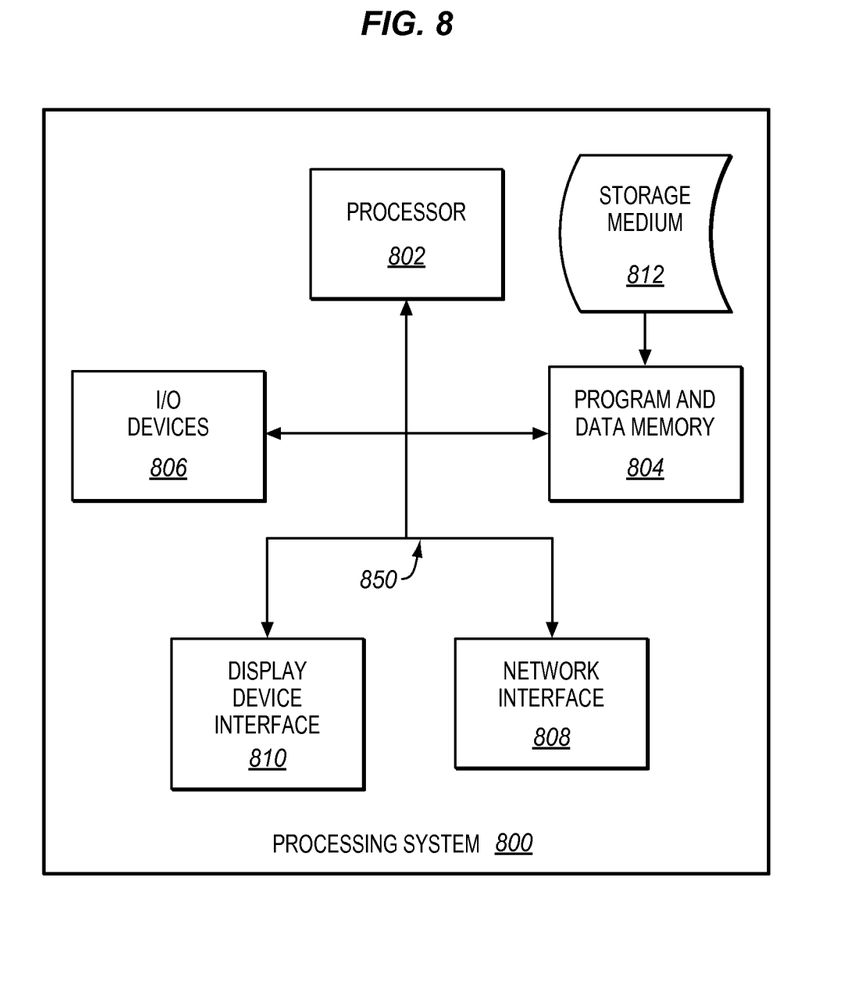
FIG. 8 is block diagram of a processing system configured to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of dryer system 200 to perform the various operations disclosed herein. FIG. 8 illustrates a processing system 800 configured to execute a computer readable medium embodying programmed instructions to perform desired functions in an exemplary embodiment. Processing system 800 is configured to perform the above operations by executing programmed instructions tangibly embodied on computer readable storage medium 812. In this regard, embodiments of the invention can take the form of a computer program accessible via computer-readable medium 812 providing program code for use by a computer or any other instruction execution system. For the purposes of this description, computer readable storage medium 812 can be anything that can contain or store the program for use by the computer.

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be integrated with the system to interface to one or more presentation devices, such as printing systems and displays for presentation of presentation data generated by processor 802.

Although specific embodiments were described herein, the scope of the invention is not limited to those specific embodiments. The scope of the invention is defined by the following claims and any equivalents thereof.

I claim:

1. A dryer of a printing system comprising:
a radiant energy source configured to apply heat to a print medium;
a reflective element installed between the radiant energy source and the print medium, and configured to have varying levels of reflectance; and
a controller configured to determine an amount of heat to supply to a region of the print medium, and to adjust an amount of reflectance of the reflective element based on the determined amount of heat.

2. The dryer of claim 1 further comprising:
a transparent structure installed between the radiant energy source and the print medium, and configured to prevent specific wavelengths from reaching the print medium.

3. The dryer of claim 1 further comprising:
a transparent structure installed between the radiant energy source and the print medium; and
a nozzle configured to circulate a fluid in a horizontal conduit between the transparent material and the reflective element to cool the reflective element.

4. The dryer of claim 3 wherein:
the transparent material includes a vertical conduit and a nozzle configured to selectively circulate the fluid downward through the vertical conduit and toward the print medium.

5. The dryer of claim 1 further comprising:
a transparent structure comprised of sheet glass and installed between the radiant energy source and the print medium; and
a grounded conductive layer disposed between the transparent material and the reflective element that is configured to prevent electromagnetic noise.

6. The dryer of claim 1 further comprising:
a sensor communicatively coupled to the controller and configured to measure a temperature within the dryer;
wherein the controller directs the reflective element based on input from the sensor.

7. The dryer of claim 1 wherein:
the reflective element includes a plurality of independently controlled segments.

8. The dryer of claim 1 further comprising:
a conductive drum configured to transport the print medium;
wherein the reflective element comprises a curved reflective element having a curvature similar to that of the conductive drum.

9. The dryer of claim 8 wherein:
the curved reflective element is disposed below the radiant energy source and above the conductive drum.

10. The dryer of claim 8 wherein:
the radiant energy source is located within the conductive drum; and
the curved reflective element is disposed within the conductive drum and between the radiant energy source and the inner radius of the conductive drum.

11. A method comprising:
operating a heating element within an interior of a dryer to apply heat onto a web of printed media as the web travels through the interior;
determining an amount of heat to supply to one or more regions of the web; and
adjusting an amount of reflectance of a reflective element based on the determined amount of heat.

12. The method of claim 11 further comprising:
eliminating specific wavelengths of radiant energy from reaching the web with a filter adjacent to the reflective element.

13. The method of claim 12 further comprising:
circulating a fluid in a horizontal conduit between the reflective element and the filter to direct fluid at the surface of the reflective element.

14. The method of claim 12 further comprising:
circulating a fluid in a vertical conduit in the filter to direct fluid at the surface of the web.

15. The method of claim 11 further comprising:
reducing electromagnetic noise at the reflective element with a grounded conductive layer of indium tin oxide on the reflective element.

16. A non-transitory computer readable medium embodying programmed instructions which, when executed by a processor, are configured for performing a method comprising:
operating a heating element within an interior of a dryer to apply heat onto a web of printed media as the web travels through the interior;
determining an amount of heat to supply to one or more regions of the web; and
adjusting an amount of reflectance of a reflective element based on the determined amount of heat.

17. The medium of claim 16 further comprising:
eliminating specific wavelengths of radiant energy from reaching the web with a filter adjacent to the reflective element.

18. The medium of claim 17 further comprising:
circulating a fluid in a horizontal conduit between the reflective element and the filter to direct fluid at the surface of the reflective element.

19. The medium of claim 17 further comprising:
circulating a fluid in a vertical conduit in the filter to direct fluid at the surface of the web.

20. The medium of claim 16 further comprising:
reducing electromagnetic noise at the reflective element with a grounded conductive layer of indium tin oxide on the reflective element.

\* \* \* \* \*